US010280796B2

United States Patent
Dall'Ara et al.

(10) Patent No.: US 10,280,796 B2
(45) Date of Patent: May 7, 2019

(54) INTEGRATED TURBOEXPANDER-GENERATOR WITH GAS-LUBRICATED BEARINGS

(71) Applicant: Nuovo Pignone Tecnologie Srl, Florence (IT)

(72) Inventors: Matteo Dall'Ara, Florence (IT); Matteo Berti, Florence (IT); Silvio Giachetti, Florence (IT); Federico Florindo, Florence (IT); Michael Catanzaro, Florence (IT)

(73) Assignee: Nuovo Pignone Tecnologie Srl, Florence (IT)

( * ) Notice: Subject to any disclaimer, the term of this patent is extended or adjusted under 35 U.S.C. 154(b) by 0 days.

(21) Appl. No.: 15/549,735

(22) PCT Filed: Feb. 5, 2016

(86) PCT No.: PCT/EP2016/052501
§ 371 (c)(1),
(2) Date: Aug. 9, 2017

(87) PCT Pub. No.: WO2016/128319
PCT Pub. Date: Aug. 18, 2016

(65) Prior Publication Data
US 2018/0030855 A1 Feb. 1, 2018

(30) Foreign Application Priority Data
Feb. 9, 2015 (IT) ................ FI2015A0027

(51) Int. Cl.
*F02C 7/06* (2006.01)
*H02K 7/08* (2006.01)
(Continued)

(52) U.S. Cl.
CPC ............ *F01D 25/22* (2013.01); *F01D 15/10* (2013.01); *F01D 25/16* (2013.01); *F02C 7/06* (2013.01);
(Continued)

(58) Field of Classification Search
USPC ................................ 290/52; 415/1; 384/119
See application file for complete search history.

(56) References Cited

U.S. PATENT DOCUMENTS 2,921,804 A * 1/1960 Jekat ................ F01D 25/02
277/431
3,105,631 A 10/1963 Hanny
(Continued)

FOREIGN PATENT DOCUMENTS

DE 10 2006 004836 A1 5/2007
EP 2 187 072 A1 5/2010

OTHER PUBLICATIONS

Italian Search Report and Opinion issued in connection with corresponding IT Application No. FI2015A000027 dated Sep. 25, 2015.
(Continued)

*Primary Examiner* — Pedro J Cuevas
(74) *Attorney, Agent, or Firm* — GE Global Patent Operation; Robert D. Crawford, III

(57) ABSTRACT

A turboexpander-generator unit including a casing with a gas inlet and a gas outlet. The unit further comprises a turboexpander having a turboexpander rotor mounted on a shaft supported for rotation in the casing, and an electric generator arranged in the casing and comprised of a generator stator and a generator rotor mounted on the shaft, for co-rotation with the turboexpander rotor. The unit also comprises a plurality of bearings configured and arranged for rotatingly supporting the shaft in the casing. A gas flow (Continued)

path from the gas inlet to the gas outlet, which extends through the turboexpander and the electric generator. Compressed working gas expands in the turboexpander and generates mechanical power for rotating the generator rotor. The expanded working gas from the turboexpander flow through the electric generator and removes heat therefrom. The bearings comprise gas-lubricated bearings, lubricated with the working gas.

26 Claims, 2 Drawing Sheets

(51) Int. Cl.
F01D 15/10 (2006.01)
H02K 7/18 (2006.01)
H02K 9/00 (2006.01)
F01D 25/16 (2006.01)
F01D 25/22 (2006.01)
F01D 25/12 (2006.01)

(52) U.S. Cl.
CPC .......... H02K 7/083 (2013.01); H02K 7/1823 (2013.01); H02K 9/00 (2013.01); F01D 25/12 (2013.01); F05D 2240/12 (2013.01); F05D 2240/53 (2013.01)

(56) References Cited

U.S. PATENT DOCUMENTS

| | | | |
|---|---|---|---|
| 3,210,553 A | 10/1965 | Cummings | |
| 3,302,865 A * | 2/1967 | Kun | F16C 32/067 384/109 |
| 3,326,453 A * | 6/1967 | Kun | F01D 25/22 384/107 |
| 3,582,228 A * | 6/1971 | Tomita | F01D 25/22 409/231 |
| 3,950,950 A | 4/1976 | Doerner et al. | |
| 4,223,529 A * | 9/1980 | Willyoung | F01K 23/062 122/4 D |
| 4,555,637 A | 11/1985 | Irvine | |
| 4,740,711 A | 4/1988 | Sato et al. | |
| 5,045,711 A | 9/1991 | Swearingen | |
| 5,113,670 A * | 5/1992 | McAuliffe | F01D 25/125 417/406 |
| 5,481,145 A | 1/1996 | Canders et al. | |
| 5,640,840 A * | 6/1997 | Briesch | F01K 21/047 60/39.55 |
| 5,780,932 A * | 7/1998 | Laffont | F01D 25/28 290/2 |
| 6,880,338 B2 | 4/2005 | Larjola | |
| 6,907,727 B2 * | 6/2005 | Turchetta | F01D 15/10 415/117 |
| 7,043,905 B2 * | 5/2006 | Turchetta | F01D 15/10 415/117 |
| 7,112,036 B2 * | 9/2006 | Lubell | F01D 25/16 415/104 |
| 7,193,341 B2 | 3/2007 | Bosen | |
| 7,278,818 B2 | 10/2007 | Bosen | |
| 7,591,150 B2 * | 9/2009 | Turner | F25J 1/0022 62/532 |
| 7,594,414 B2 * | 9/2009 | Wilding | F25J 1/0262 62/611 |
| 7,637,122 B2 * | 12/2009 | Turner | F25J 1/0204 62/532 |
| 7,638,892 B2 | 12/2009 | Myers | |
| 7,658,778 B2 * | 2/2010 | Pope | C08G 77/60 526/286 |
| 7,841,306 B2 | 11/2010 | Myers et al. | |
| 8,083,413 B2 | 12/2011 | Ertas | |
| 8,384,232 B2 | 2/2013 | Myers et al. | |
| 8,395,288 B2 | 3/2013 | Huynh | |
| 8,421,258 B2 | 4/2013 | Pozivil et al. | |
| 8,827,636 B2 * | 9/2014 | Mariotti | F01D 25/16 415/104 |
| 9,121,448 B2 * | 9/2015 | Delgado Marquez | F01D 25/166 |
| 9,429,191 B2 * | 8/2016 | Ertas | F01D 25/164 |
| 9,777,669 B2 * | 10/2017 | Lynn | F01K 11/04 |
| 9,890,705 B2 * | 2/2018 | Kou | F02C 3/26 |
| 9,903,588 B2 * | 2/2018 | Slobodyanskiy | F02C 3/34 |
| 9,951,637 B2 * | 4/2018 | Berti | F01D 11/001 |
| 10,094,566 B2 * | 10/2018 | Borchert | F23R 3/28 |
| 10,145,269 B2 * | 12/2018 | Pakkala | F23N 5/003 |
| 2004/0146394 A1 * | 7/2004 | Turchetta | F01D 15/10 415/13 |
| 2005/0089392 A1 * | 4/2005 | Lubell | F01D 25/16 415/104 |
| 2005/0217259 A1 * | 10/2005 | Turchetta | F01D 15/10 60/398 |
| 2006/0213223 A1 * | 9/2006 | Wilding | F25J 1/0262 62/613 |
| 2006/0218939 A1 * | 10/2006 | Turner | F25J 1/0022 62/4 |
| 2007/0017250 A1 * | 1/2007 | Turner | F25J 1/0204 62/613 |
| 2007/0056285 A1 | 3/2007 | Brewington | |
| 2007/0107465 A1 * | 5/2007 | Turner | F25J 1/0022 62/613 |
| 2008/0184686 A1 * | 8/2008 | Pope | C08G 77/60 55/521 |
| 2010/0186446 A1 * | 7/2010 | Turner | F25J 1/0204 62/611 |
| 2011/0100017 A1 * | 5/2011 | Kou | F02C 3/26 60/776 |
| 2012/0020595 A1 | 1/2012 | Kim | |
| 2012/0306206 A1 * | 12/2012 | Agrawal | F04D 25/024 290/52 |
| 2013/0098037 A1 | 4/2013 | Maier | |
| 2015/0104123 A1 * | 4/2015 | Ertas | F01D 25/164 384/119 |
| 2015/0104124 A1 * | 4/2015 | Delgado Marquez | F01D 25/166 384/119 |
| 2015/0226076 A1 * | 8/2015 | Berti | F01D 11/001 415/1 |
| 2015/0292349 A1 * | 10/2015 | Mariotti | F01D 17/16 415/1 |
| 2015/0330261 A1 * | 11/2015 | Held | F01D 11/003 60/326 |
| 2015/0345341 A1 * | 12/2015 | Kacludis | F02C 1/04 60/671 |
| 2016/0102608 A1 * | 4/2016 | Lynn | F02C 3/16 60/787 |
| 2016/0102631 A1 * | 4/2016 | Lynn | F01K 11/04 60/517 |
| 2017/0023011 A1 * | 1/2017 | Berti | F01D 25/16 |
| 2017/0191482 A1 * | 7/2017 | Preuss | F04D 15/0083 |
| 2017/0298830 A1 * | 10/2017 | Ertas | F02C 7/275 |

OTHER PUBLICATIONS

International Search Report and Opinion issued in connection with corresponding PCT Application No. PCT/EP2016/052501, dated Apr. 12, 2016.
International Preliminary Report on Patentability issued in connection with corresponding PCT Application No. PCT/EP2016/052501, dated Aug. 15, 2017.

* cited by examiner

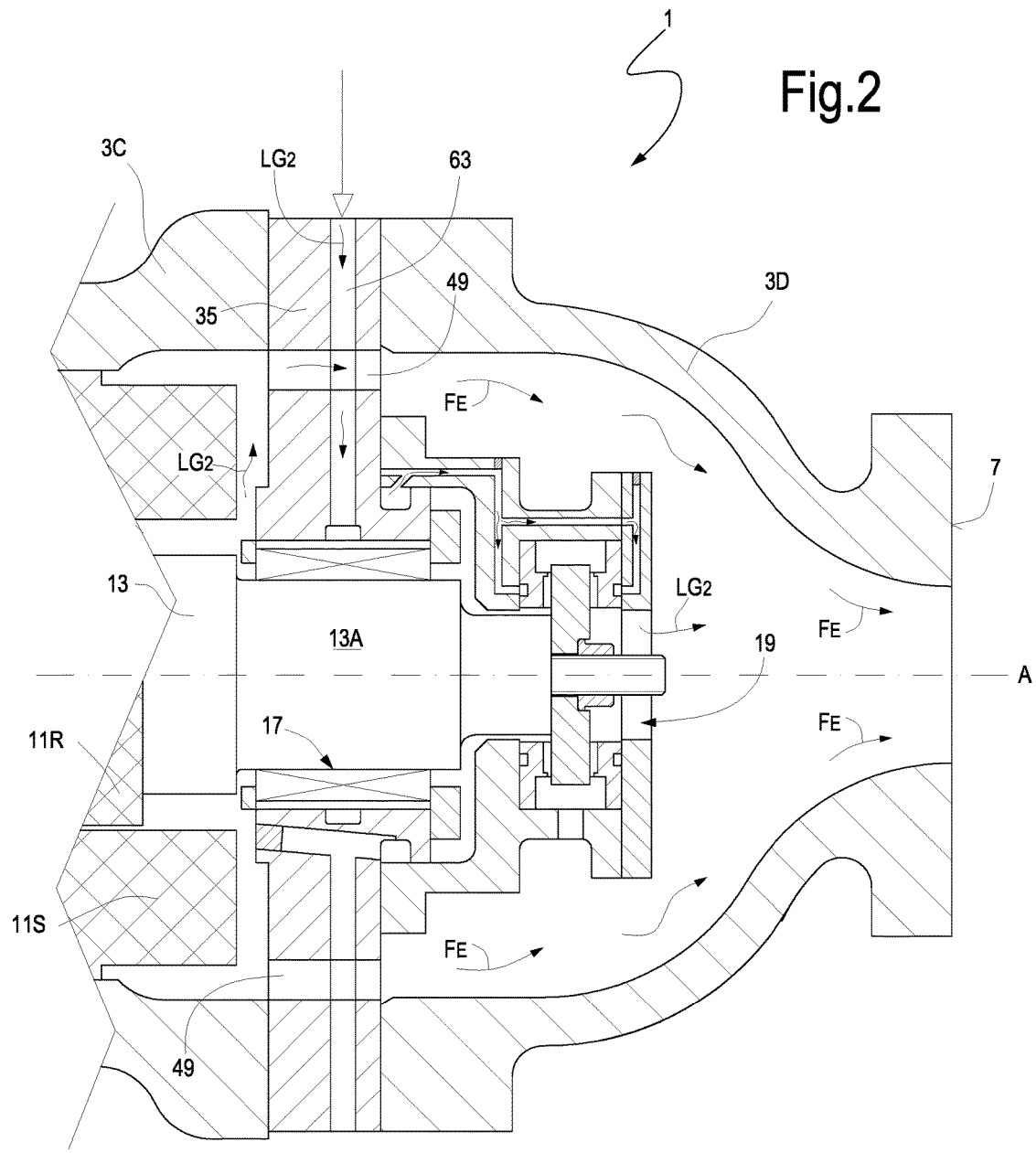

US 10,280,796 B2

INTEGRATED TURBOEXPANDER-GENERATOR WITH GAS-LUBRICATED BEARINGS

FIELD OF THE INVENTION

The disclosure relates to integrated expander-generators, i.e. turboexpander-generator units generally including an expander receiving compressed gas and producing mechanical power from the expansion of the gas, mechanically coupled to an electric generator, for converting mechanical power available on the shaft of the expander into electric power.

BACKGROUND OF THE INVENTION

Turboexpander-generator units are commonly used machines for converting power contained in a flow of compressed gas into useful mechanical power available on an output shaft of the turboexpander. The output shaft can be used to mechanically drive a rotating machine, for example an electric generator. Integrated turboexpander-generator units usually comprise a gas tight casing housing a turboexpander with a rotating wheel or a plurality of rotating wheels, provided with blades, mounted on a rotating shaft. The shaft is supported for rotation in the casing and is mechanically connected to the rotor of an electric generator, the stator whereof is stationarily mounted in the casing.

The rotating shaft, whereon the rotating parts of the turboexpander and the electric generator are mounted, is usually supported in the casing by means of a plurality of bearings. In known embodiments oil lubricated bearings are used for this purpose. More recently, active magnetic bearings have been developed for applications in turboexpander-generator units. Active magnetic bearings avoid the need of lubricating oil and therefore overcome drawbacks related to the presence of oil in the gas flow through the turboexpander-generator unit.

However, active magnetic bearings are complex machine components, which furthermore require an electronic control through dedicated electronic control units. A complex wiring connecting the control unit to the magnetic bearings is required, which makes assembling of the turboexpander-generator even more complicated.

The need therefore exists for a more efficient, less expensive turboexpander-generator unit, which is simpler to design, assemble and maintain.

SUMMARY OF THE INVENTION

According to embodiments disclosed herein, a turboexpander-generator unit is provided, comprising a casing with a gas inlet and a gas outlet. The turboexpander-generator unit further comprises a turboexpander having a turboexpander rotor mounted on a shaft supported for rotation in the casing. Furthermore, an electric generator can be arranged in the casing. The electric generator can be comprised of a generator stator and a generator rotor arranged on the shaft, for co-rotation with the turboexpander rotor. The turboexpander-generator unit can further comprise a plurality of bearings configured and arranged for rotatingly supporting the shaft in the casing. A gas flow path in the casing extends from the gas inlet to the gas outlet, through the turboexpander and the electric generator. Compressed working gas can thus expand in the turboexpander and generate mechanical power for rotating the generator rotor. Expanded working gas from the turboexpander flows through the electric generator and removing heat therefrom. At least one, some or all the bearings, which support the rotating shaft of the turboexpander-generator unit, are gas-lubricated bearings, lubricated with the working gas processed through the turboexpander-generator unit.

Lubrication oil and relevant circuitry are avoided. The absence of active magnetic bearings, replaced by gas-lubricated bearings, renders the turboexpander-generator unit simple and less expensive, more reliable and facilitates maintenance thereof.

The working gas can thus be used for cooling the electric generator. The same working gas can be used for lubricating the gas-lubricated bearings. The turboexpander-generator unit can comprise e.g. a lubricating gas supply, fluidly coupled to the gas inlet and to the gas-lubricated bearings, for supplying working gas diverted upstream of the turboexpander to the gas-lubricated bearings.

According to some embodiments, the gas-lubricated bearings are in fluid communication with the gas flow path, such that lubrication gas flows from the gas-lubricated bearings back into the gas flow path.

The turboexpander rotor can comprise one or more impellers. In some embodiments, the turboexpander rotor is overhung off a first end of the shaft. The gas-lubricated bearings can include one or more axial or thrust bearings and one or more, in an embodiment two radial bearings. The axial or thrust bearing can be arranged at a second end of the shaft. In other embodiments, the axial or thrust bearing can be arranged between the electric generator and the turboexpander. A first radial gas-lubricated bearing can be positioned between the turboexpander rotor and the generator rotor. A second radial gas-lubricated bearing can be positioned between the generator rotor and the second shaft end. For instance, the second radial gas-lubricated bearing is located between the generator rotor and the second end of the shaft.

Disclosed herein is further a turboexpander-generator unit, comprising: a casing comprised of a gas inlet and a gas outlet; a turboexpander section housed in the casing and comprised of a turboexpander rotor mounted on a shaft supported for rotation in the casing; an electric generator section housed in the casing and comprised of a generator rotor arranged on the shaft, such that the turboexpander rotor and the generator rotor rotate at the same speed; a bearing arrangement rotatingly supporting the shaft in the casing; a working gas flow path between the gas inlet and the gas outlet and extending through the turboexpander section and the electric generator section, configured and arranged such that compressed working gas expands in the turboexpander section and expanded working gas from the turboexpander flows through the electric generator section and removes heat therefrom; wherein the bearing arrangement comprises gas-lubricated bearings, lubricated with said working gas.

Disclosed herein is further a method for producing electric power from a flow of compressed working gas, comprising the following steps: expanding the compressed working gas in a turboexpander disposed within a casing, the turboexpander comprising a turboexpander rotor mounted on a rotating shaft, mechanical power generated by expansion of the compressed working gas being available on the rotating shaft; the rotating shaft being supported by a plurality of gas-lubricated bearings; driving a generator rotor of an electric generator disposed within the casing, with power generated by the turboexpander, the generator rotor being mounted on the rotating shaft; flowing expanded gas from the turboexpander through the electric generator and thereby removing heat from the electric generator; extracting a side stream of working gas from a main working gas stream and lubricating the gas-lubricated bearings with the working gas side stream.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 2 illustrates an enlargement of the outlet side end of the turboexpander-generator shaft and relevant bearings.

DETAILED DESCRIPTION

Figure 1:
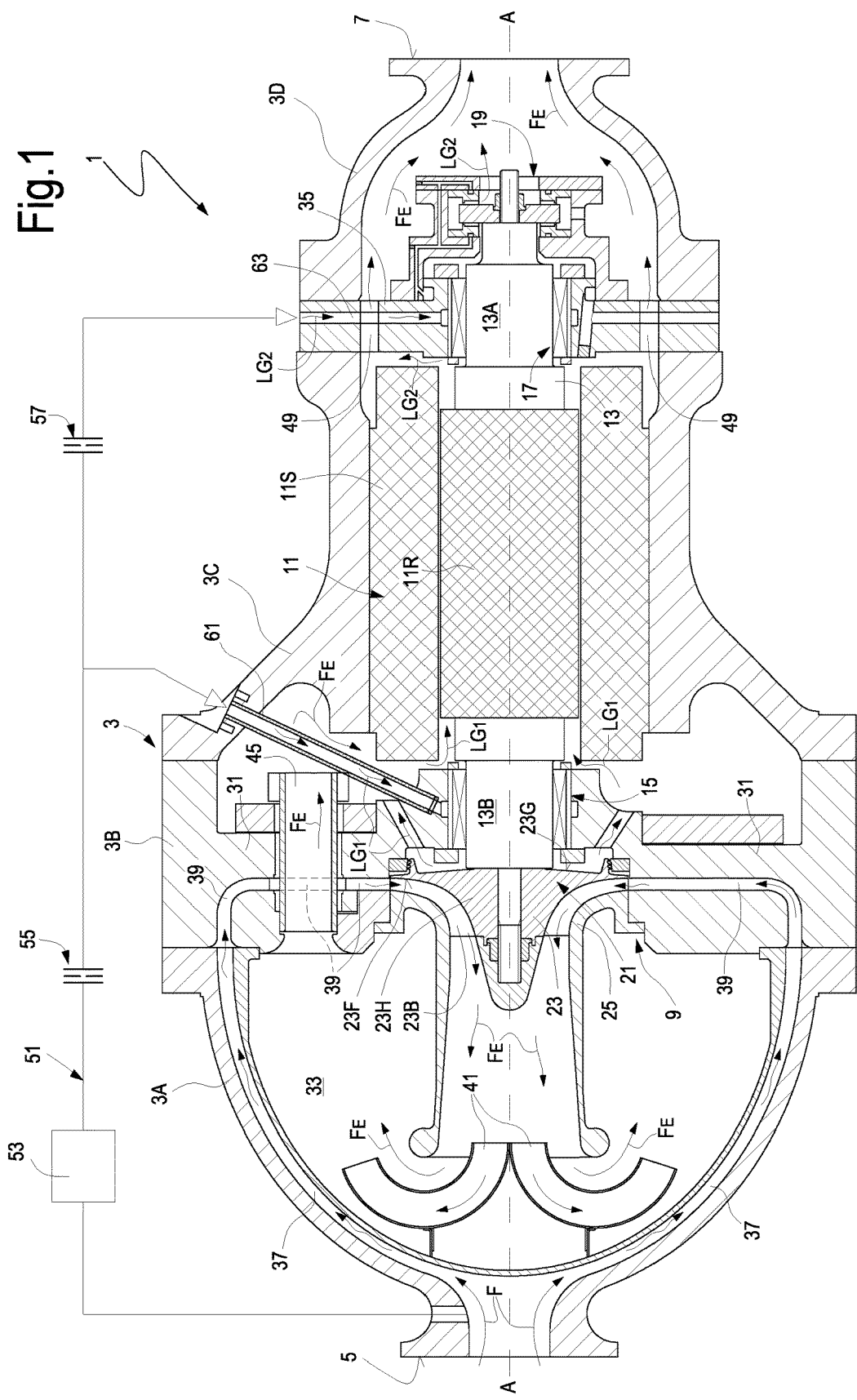
FIG. 1 illustrates a sectional view of a turboexpander-generator unit according to the present disclosure.

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

In FIG. 1 an integrated turboexpander-generator, or turboexpander-generator unit 1, is shown in a sectional view according to a plane containing the rotation axis A-A of the machine. The turboexpander-generator unit 1 can comprise a casing 3, for example a gas-tight casing. The casing 3 can be comprised of an inlet 5 and an outlet 7. In some embodiments the casing 3 can include an inlet casing portion 3A, an intermediate turboexpander casing portion 3B, a generator casing portion 3C and an outlet casing portion 3D. The portions 3A-3D can be sealingly connected to one another, so that a gas tight casing 3 extending from inlet 5 to outlet 7 is obtained. A different casing design, with a larger or smaller number of casing portions can be envisaged.

The casing 3 can house a turboexpander 9 and an electric generator 11. A shaft 13 can be rotatingly supported within the casing 3. The shaft 13 can rotate around axis A-A. A generator rotor 11R can be arranged on the shaft 13. In some embodiments, the generator rotor 11R can be mounted on the shaft 13 for co-rotation with shaft 13 and turboexpander 9. In other embodiments, as illustrated in FIG. 1, the generator rotor 11R is integrally formed on the shaft 13, i.e. a portion of shaft 13 forms itself the generator rotor 11R. The generator rotor 11R is arranged co-axially inside a generator stator 11S, which is stationarily housed in the casing 3, e.g. in the generator casing portion 3C.

The shaft 13 can be rotatingly supported in the casing 3 by means of a plurality of bearings. According to some embodiments, a first radial bearing 15 can be arranged between the electric generator 11 and the turboexpander 9. A second radial bearing 17 can be located near an end 13A of the rotating shaft 13, opposite the turboexpander 9 (see also FIG. 2). In some embodiments, an axial bearing, or thrust bearing, 19 can further be provided, for instance at or near the end 13A of the rotating shaft 13. In other embodiments the axial bearing or thrust bearing 19 can be arranged in a position intermediate the generator rotor 11R and the impeller of the turboexpander 9. One or both the radial bearings 15, 17 and/or the axial bearing 19 can be gas-lubricated bearings. In some embodiments, the axial and/or radial bearings are hybrid bearings, i.e. partially hydrostatic and partially hydrodynamic bearings.

According to some embodiments, the radial bearings 15, 17 can be compliant hybrid gas-lubricated radial bearings as disclosed in U.S. Pat. No. 8,083,413, the content whereof is incorporated herein by reference. The thrust or axial bearing 19 can be a compliant hybrid thrust bearing as disclosed in US 2012/0020595, the content whereof is incorporated herein by reference.

In some embodiment, the turboexpander 9 can be comprised of a turboexpander rotor 21, which can comprise an impeller 23 mounted on the rotating shaft 13 at or near a shaft end 13B, opposite shaft end 13A. Impeller 23 and shaft 13 are torsionally constrained to one another such that shaft 13 and impeller 23 rotate together. The impeller 23 can be mounted overhung off the shaft end 13B.

The impeller 23 can comprise an impeller hub 23H, which can be provided with a plurality of blades 23B. The blades 23B can project from a front surface 23F of hub 23H. A back surface 23G of hub 23H, opposite the front surface 23F, faces the electric generator 11.

A shroud 25 can be stationarily mounted inside the casing 3 and can be arranged adjacent to the tips of blades 23B. In other embodiments, not shown, a shroud rotating integrally with the blades 23B can be provided instead of a stationary shroud.

The blades 23B define gas passages extending from an impeller inlet to an impeller outlet. As shown in FIG. 1, the impeller inlet is oriented in a radial direction, while the impeller outlet is oriented in axial direction.

The radial bearing 15 can be mounted in a partition wall 31 extending radially inwardly towards the rotation axis A-A from the outer casing 3. The partition wall 31 can separate the interior of the generator casing portion 3C, which houses the electric generator 11, from an outlet plenum 33, which collects the expanded gas discharged by the turboexpander 9.

In some embodiments, a further partition wall 35 extending radially inwardly from the outer casing 3 towards the rotation axis A-A can be provided between the generator casing portion 3C and the outlet casing portion 3D. The second radial bearing 17 can be mounted in the partition wall 35.

A gas flow path can extend from the gas inlet 5 towards the inlet of the impeller 23. The gas flow path can be comprised of channels 37, which extend around the outlet plenum 33 from the gas inlet 5 towards the partition wall 31. Passages 39 can be formed in the partition wall 31 and in flow communication with the inlet of the impeller 23.

A gas deflector 41 can be arranged in front of the turboexpander impeller 23. The gas deflector 41 can be arranged and configured to deviate a gas flow from the exit side of the impeller 23 towards flow passages 45 extending across the partition wall 31 and placing the outlet plenum 33 in flow communication with the interior of the generator casing portion 3C, where the electric generator 11 is housed.

With the arrangement described so far a flow F of compressed gas enters the turboexpander-generator unit 1 at the inlet 5 and flows along the flow path 37, 39 and finally enters into the impeller 23 in a generally radially inwardly oriented direction. Compressed gas entering the impeller 23 of the turboexpander 9 expands while flowing through gas passages formed between adjacent turboexpander blades 23B. The expanded gas flows according to arrows $F_E$ from the impeller 23 against to deflector 41 into the outlet plenum 33. Therefrom the expanded gas flows further through the passages 45 into the housing formed by the generator casing portion 3C, where the electric generator 11 is arranged.

The expanded gas has sufficient pressure to flow through the rotor/stator arrangement 11R, 11S of the electric generator 11, reaching the partition wall 35, which is provided with further passages 49, where through the expanded gas exits the casing portion, where the electric generator 11 is housed, and achieves the gas outlet 7.

The compressed gas F thus generates mechanical power available on the rotating shaft 13 by expanding in the turboexpander 9. The power is used to rotate the generator rotor 11R, thus converting the mechanical power generated by the turboexpander 9 into useful electric power, which can be made available on an electric distribution grid, not shown, or directly supplied to a user.

The expanded gas flows (arrow $F_E$) through the electric generator 11, thereby removing heat therefrom and cooling the electric generator. In the embodiment illustrated in FIG. 1, the entire expanded gas flows through the electric generator 11. This however, is not mandatory. In other embodiments a portion only of the expanded gas can be caused to flow through the electric generator 11, if this is expedient.

A side stream of the gas delivered to the turboexpander-generator unit 1 can be taken from the main stream at the gas inlet 5 and used to lubricate the radial bearings 15, 17 and/or the axial bearing 19.

A lubricating gas supply 51 is fluidly coupled between the inlet 5 and the bearings 15, 17 and 19. The lubricating gas supply 51 is schematically shown in FIG. 1. In some embodiments a filter arrangement 53 can be provided in or along the lubricating gas supply 51. A side stream of working gas flowing through the turboexpander-generator unit 1 is diverted through the lubricating gas supply 51 and supplied to the gas-lubricated bearings 15, 17, 19. Possible solid or liquid matter, which could be contained in the side stream of the working gas used to lubricate the bearings 15, 17 and 19, can be removed by the filter arrangement 53, to prevent or reduce ingress of solid/liquid matter into the bearings.

In some embodiments a pressure reduction device 55 can also be provided in or along the lubricating gas supply 51. In some embodiments the pressure reduction device 55 reduces the pressure of the side stream gas from the inlet pressure at the gas inlet 5 to a pressure intermediate the inlet gas pressure and the outlet gas pressure at the outlet 7 of the turboexpander-generator unit 1. The gas pressure at the downstream side of the pressure reducing device 55 is set at an optimum value for gas lubrication purposes. In some embodiments a single pressure reduction device 55 can be provided, such that lubricating gas at the same pressure is delivered to all bearings 15, 17 and 19. In other embodiments, more than one pressure reduction device can be provided in the lubricating gas supply 51, such that different gas pressures can be used for different bearings 15, 17, 19, for example the most upstream bearing 15 can be supplied with lubricating gas at a higher pressure, while the second, downstream radial bearing 17 and the axial bearing 19 can be lubricated with a lower pressure lubricating gas. This is schematically represented in FIG. 1 by a second pressure reduction device 57 arranged downstream the first pressure reduction device 55.

Reference numbers 61 and 63 indicate ducts which fluidly connect the lubrication gas supply 51 with bearings 15 and 17, 19, respectively.

Lubricating gas LG1 delivered to the bearing 15 can be discharged from the bearing 15 into the main gas flow as schematically shown by arrows $LG_1$ in the schematic of FIG. 1. Similarly, lubricating gas LG2 delivered to the second radial bearing 17 and to the axial bearing or thrust bearing 19 can also be discharged in the main flow as shown by arrows $LG_2$.

With the above described arrangement the working gas processed by the turboexpander 9 is thus used to produce mechanical power, which is converted into useful electric power by the electric generator 11. The same gas is also used for cooling purposes, to remove heat from the electric generator 11. A side stream of the same working gas processed through the turboexpander-generator unit 1 is further used for lubricating purposes, to lubricate the radial bearings 15, 17 and the thrust or axial bearing 19. Use of lubricating oil is thus avoided. Complex and expensive active magnetic bearings are also dispensed with and replaced with simple, less expensive and easy to maintain gas-lubricated bearings.

A turboexpander-generator unit 1 as disclosed herein can be used in so-called pressure letdown installations, where the pressure of natural gas from a pipeline is reduced down to pressure values suitable for local-distribution networks of gas utilities. At least a portion of the power required to pressurize the gas for transportation purposes through the pipeline is thus recovered into useful electric power. The use of the same working gas for cooling the electric generator and lubricating the gas-lubricated bearings renders the turboexpander-generator unit particularly simple, inexpensive and reliable, as well as efficient from an energetic point of view.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turboexpander-generator unit, comprising:
   a casing with a gas inlet and a gas outlet;
   a turboexpander having a turboexpander rotor mounted on a shaft supported for rotation in the casing;
   an electric generator arranged in the casing and comprising a generator stator and a generator rotor mounted on the shaft, for co-rotation with the turboexpander rotor;
   a plurality of gas-lubricated bearings configured and arranged for rotatingly supporting the shaft in the casing;
   a main gas flow path from the gas inlet to the gas outlet, extending through the turboexpander and the electric generator; and
   a side gas flow path from the main gas flow path to the plurality of gas-lubricated bearings;
   wherein compressed working gas passing through the main gas flow path expands in the turboexpander to generate mechanical power for rotating the generator rotor and remove heat from the electric generator; and
   wherein a portion of the compressed working gas passing through the side gas flow path lubricates the plurality of gas-lubricated bearings.

2. The turboexpander-generator unit of claim 1, wherein the gas-lubricated bearings are in fluid communication with the main gas flow path, such that the portion of the working gas lubricating the gas-lubricated bearings flows from the gas-lubricated bearings back into the main gas flow path.

3. The turboexpander-generator unit of claim 1, wherein the gas-lubricated bearings comprise at least one axial gas-lubricated bearing and two radial gas-lubricated bearings.

4. The turboexpander-generator unit of claim 1, wherein the turboexpander rotor is overhung off one end of the shaft.

5. The turboexpander-generator unit of claim 3, wherein the turboexpander rotor is overhung off a first end of the shaft, and wherein the at least one axial gas-lubricated bearing is arranged at a second end of the shaft or between the electric generator and the turboexpander.

6. The turboexpander-generator unit of claim 3, wherein a first one of the at least two radial gas-lubricated bearings is positioned between the turboexpander rotor and the generator rotor, and a second one of the at least two radial gas-lubricated bearings is positioned between the generator rotor and the second shaft end.

7. The turboexpander-generator unit of claim 1, wherein the side gas flow path comprises a lubricating gas supply line, fluidly coupled from the main gas inlet and to the gas-lubricated bearings, for supplying the portion of the compressed working gas diverted upstream of the turboexpander to the gas-lubricated bearings downstream of the turboexpander.

8. The turboexpander-generator unit of claim 7, further comprising a filter system associated to the lubricating gas supply line.

9. The turboexpander-generator unit of claim 7, further comprising at least one pressure reduction device along the lubricating gas supply line, for reducing the pressure of the portion of the working gas from a gas inlet pressure to a lubrication pressure, lower than the gas inlet pressure.

10. The turboexpander-generator unit of claim 1, wherein the gas inlet and the gas outlet are substantially coaxial to one another.

11. The turboexpander-generator unit of claim 10, wherein the gas inlet and the gas outlet are substantially coaxial with the shaft.

12. The turboexpander-generator unit of claim 1, wherein the turboexpander rotor comprises a substantially radially oriented rotor inlet and a substantially axially oriented rotor outlet.

13. The turboexpander-generator unit of claim 1, wherein the turboexpander rotor comprises an impeller comprised of a hub having a front surface and a back surface, and a plurality of blades extending from the front surface of the hub to respective blade tips.

14. The turboexpander-generator unit of claim 13, further comprising a stationary shroud adjacent the blade tips.

15. The turboexpander-generator unit of claim 13, wherein the back surface of the hub faces the electric generator and the front surface of the hub faces the gas inlet.

16. The turboexpander-generator unit of claim 15, wherein the turboexpander comprises an outlet plenum, configured and arranged for collecting expanded working gas exiting the turboexpander rotor and fluidly coupled with a casing portion housing the electric generator.

17. The turboexpander-generator unit of claim 16, wherein the casing comprises a partition wall separating the outlet plenum and the casing portion housing the electric generator, flow passages for expanded working gas extending through the partition wall.

18. The turboexpander-generator unit of claim 16, wherein the gas flow path extends from the gas inlet around the outlet plenum and towards the turboexpander rotor.

19. The turboexpander-generator unit of claim 16, wherein a gas deflector is arranged substantially coaxial to the turboexpander rotor and facing the front surface of the hub, the gas deflector being configured and arranged for deflecting the expanded gas from the turboexpander rotor towards the electric generator.

20. The turboexpander-generator unit of claim 1, wherein each of the plurality of gas-lubricated bearings are hydrostatic and/or hydrodynamic bearings.

21. The turboexpander-generator unit of claim 1, wherein each of the plurality of gas-lubricated bearings are lubricant-free.

22. A method for producing electric power from a flow of compressed working gas, the method comprising the following steps:

expanding the compressed working gas in a turboexpander disposed within a casing, the turboexpander comprising a turboexpander rotor mounted on a rotating shaft, mechanical power generated by expansion of the compressed working gas being available on the rotating shaft; the rotating shaft being supported by a plurality of gas-lubricated bearings;

driving a generator rotor of an electric generator disposed within the casing, with power generated by the turboexpander, the generator rotor being arranged on the rotating shaft;

flowing expanded working gas from the turboexpander through the electric generator and removing heat therewith from the electric generator; and diverting a portion of the flow of compressed working gas to provide a side stream of compressed working gas to the plurality of gas-lubricated bearings to lubricate the gas-lubricating bearings.

23. The method of claim 22, further comprising returning the side stream of compressed working gas from the gas-lubricated bearings to the expanded working gas stream, downstream of the turboexpander.

24. The method of claim 22, wherein the side stream of compressed working gas is diverted from the compressed working gas upstream of the turboexpander.

25. The method of claim 24, further comprising reducing the pressure of the side stream of compressed working gas prior to delivering to the gas-lubricated bearings.

26. The method of claim 22, further comprising cleaning the side stream of compressed working gas prior to delivering to the gas-lubricated bearings.

* * * * *